Aug. 27, 1963  R. F. KIMPEL  3,102,037
REFRACTORY CEMENT COMPOSITION
Filed Dec. 16, 1957
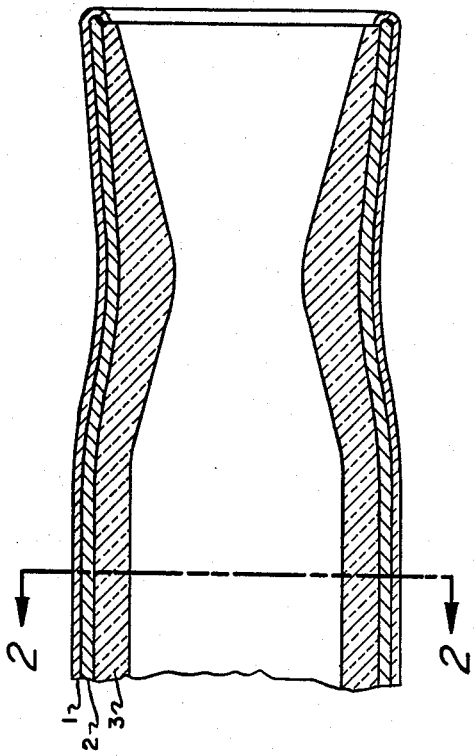
Fig-1-
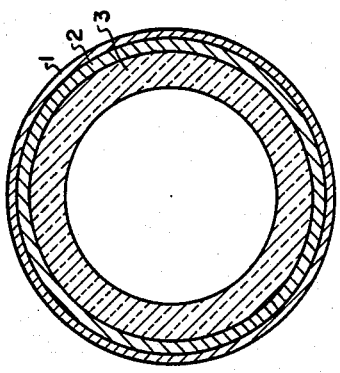
Fig-2-
INVENTOR.
ROBERT F. KIMPEL
BY D. Gordon Angus
ATTORNEY

United States Patent Office 3,102,037
Patented Aug. 27, 1963

3,102,037
REFRACTORY CEMENT COMPOSITION
Robert F. Kimpel, Azusa, Calif., assignor to Aerojet-General Corporation, Azusa, Calif., a corporation of Ohio
Filed Dec. 16, 1957, Ser. No. 703,215
6 Claims. (Cl. 106—57)

This invention relates to a novel improved insulating refractory cement and to its preparation.

The cement of this invention comprises a hardened mixture of a finely divided refractory oxide such as zirconium oxide, a light-weight refractory oxide such as bubble aggregate aluminum oxide, a chemical setting agent such as sodium silicofluoride, and sodium silicate solution. The cement of this invention may also contain a light-weight insulating ingredient such as diatomaceous earth. This cement is particularly valuable in providing support for ceramic linings in uncooled rocket thrust chambers.

In the conventional operation of rockets, propellants are burned in a thrust chamber producing high temperature gases, generally in excess of 4000° F., at relatively high pressures, generally in excess of 300 p.s.i. The gases are exhausted through a conventional venturi nozzle producing the desired propulsive thrust. These conditions of high temperature and pressure impose severe limitations on rocket chamber construction, and there has long been a need for materials capable of withstanding these conditions so as to avoid the necessity of complex cooling means, such as regeneratively cooled chambers, and also to reduce the weight of materials necessary to maintain structural integrity under these conditions.

One solution to this problem has been the use of refractory ceramic linings, which are capable of withstanding extremely high temperatures, in an uncooled rocket chamber.

The cement of this invention is particularly useful for supporting such refractory ceramic linings in uncooled combustion chambers.

In a ceramic-lined combustion chamber, the ceramic lining is supported within the metal casing of the chamber by an annular layer of cement between lining and casing, the resultant composite wall (ceramic and cement) acting to protect the metal casing from the high combustion temperatures and corrosive gases within the combustion chamber.

FIGURE 1 shows in longitudinal section a typical ceramic-lined rocket thrust chamber.

FIGURE 2 is a cross-section on the line 2—2 of FIGURE 1.

Referring now to FIGURES 1 and 2 there is shown a metal chamber casing 1, a ceramic lining 3 and an annular layer of cement 2 which fills the space between the metal casing and the ceramic lining and adheres to both, thus providing firm support for the latter.

Inasmuch as ceramic linings tend to be porous and are rather easily cracked in use because of their brittle nature and susceptibility to mechanical and thermal shock, it is desirable that such a ceramic lining be firmly supported by a refractory material between the lining and the metal casing which it is designed to protect. It is also most important that the refractory material completely fill the annular space between lining and casing to prevent the passage of hot corrosive combination gases under pressure into this space. Leakage of the hot combustion gases into space between the ceramic lining and the metal casing will result in corrosion and overheating of the metal wall, producing burn-out or chamber rupture. Since rocket combination chambers are primarily used on airborne vehicles, it is important that the weights of their component parts be kept to a minimum.

Heretofore, cements available for use in supporting ceramic linings in rocket combustion chambers have suffered severe shrinkage under operating conditions or have had undesirably high densities. A suitable cement for this purpose must be capable of withstanding high temperatures, exhibit little change in volume over wide intervals of time and ranges of temperatures, show good heat insulating ability, and be of relatively low density, preferably below about 100 lb./cu. ft. In addition, the cement composition, during use, must be readily castable in narrow spaces, such as the extremely narrow annuli between linings and casings of rocket chambers.

A principal object of the present invention is to provide an improved insulating and refractory cement for the ceramic linings in uncooled, ceramic-lined rocket combustion chambers.

The cement composition of this invention is prepared by mixing a finely divided refractory oxide such as zirconium oxide, a light-weight refractory oxide such as bubble aggregate aluminum oxide, a chemical setting agent such as sodium silicofluoride, sodium silicate solution and, usually, water. If desired, a light-weight insulating component such as diatomaceous earth may be mixed with the above ingredients to produce a final cement of lower density. The resulting mixture is prepared in the form of a slurry of the desired consistency, usually such that it can be cast, easily with the aid of vibration, in a narrow annular space such as that between the ceramic liner and the metal casing of a rocket combustion chamber to substantially fill such space.

The following is an example illustrating the manner of formulating and using the cement of the present invention. This example is included for purposes of illustration only and is not indicative of the scope of the invention which is not limited to the partcular conditions set forth therein.

*Example I*

The following ingredients were mixed in the weight proportions indicated:

| | Percent |
|---|---|
| Zirconium oxide (325-mesh) | 30.5 |
| Calcined diatomaceous earth (32-mesh) | 5.2 |
| Aluminum oxide bubble aggregate (18-mesh) | 27.0 |
| Sodium silicofluoride, C. P. | 3.0 |
| Sodium silicate solution 40° Bé. | 28.7 |
| Water | 5.5 |

In preparing the above mixture, the ingredients were mechanically stirred to a uniform consistency, the stirring being continued for about three minutes. The resultant slurry was cast in a mold with vibration, over a period of about 10 min., after which it was allowed to harden and cure for a period of several hours. After curing, the cast cement was dried at a temperature of about 180°. The dried cement had a bulk density of ninety-eight pounds per cubic foot; a thermal conductivity (k) of 6 B.t.u. hr.$^{-1}$ ft.$^{-2}$ ° F.$^{-1}$ inch; linear shrinkage 0.5–1.2% at 1500° F.; utility to 2000° F. on hot side of casting; good resistance to fuming nitric acid (160° F.); compressive strength 1600 p.s.i. As those skilled in the art will realize from these results, the cement of this example was an excellent insulating cement for supporting ceramic linings in uncooled rocket combustion chambers.

*Example II*

The following is an example illustrating the use of my novel cement composition in the fabrication of a ceramic-lined rocket thrust chamber.

The cement composition of Example I was prepared as described therein. A ceramic lining was positioned concentrically within a metal chamber casing, the lining being of appropriate size and cross sectional configuration to fit within the casing and leave a narrow annular space between it and the casing. The cement composition was introduced or cast in the annular space, with vibration of the casing and lining, after which it was allowed to set. After the cement had set it was permitted to cure for several hours and then dried at about 180° F.

The resulting ceramic-lined chamber was tested by firing a mixture of hydrocarbon fuel and nitric acid therein for sixty seconds, during which time the pressure of the combustion gases in the chamber was about 315 p.s.i.g.

After the test firing the chamber was inspected and the ceramic lining, cement and metal casing were found to be in excellent condition.

*Example III*

The following ingredients were mixed in the proportions indicated.

| Ingredients: | Parts by weight |
|---|---|
| Zirconium oxide (325 mesh) | 30.5 |
| Aluminum oxide bubble aggregate (18-mesh) | 32.2 |
| Aluminum oxide (100-mesh) | 7.0 |
| Sodium silicofluoride, C.P. | 3.0 |
| Sodium silicate solution, 40° Bé. | 28.7 |
| Water | 5.5 |

In preparing the above mixture, the ingredients were stirred to a uniform consistency with a small ⅛ inch thick by 3 inches diameter disc (perforated with four ½ inch diameter holes), mounted on the end of a ¼ inch shaft turned at a speed of about 1200–1500 r.p.m., the stirring being continued for about five minutes. The resultant slurry was cast in a mold with vibration, over a period of about 10 minutes, after which it was allowed to harden and to cure for a period of several hours. After curing, the cast cement was dried at a temperature of about 180° F. The dried cement was slightly higher in bulk density and thermal conductivity than the cement of Example I but its other properties were substantially the same as those given in Example I.

*Example IV*

This example illustrates the use of the cement composition of Example III in the preparation of a ceramic-lined rocket thrust chamber.

A ceramic lining was positioned concentrically within a metal chamber casing, the lining being of appropriate size and cross sectional configuration to fit within the casing and leave a narrow annular space between it and said casing. The cement composition of Example III was introduced or cast in the annular space with vibration of the casing and lining after which it was allowed to set. After the cement had set it was permitted to cure several hours and then dried at about 180° F.

The resulting ceramic-lined chamber was tested by firing a mixture of hydrocarbon fuel and nitric acid therein for sixty seconds, during which time the pressure of the combustion gases in the chamber was about 315 p.s.i.g.

After the test firing, the chamber was inspected and the ceramic lining, cement, and metal casing were found to be in excellent condition.

The finely divided refractory oxide ingredient of my cement composition is preferably zirconium oxide of about 95% purity and having a particle size of about 200-mesh or smaller. It is within the scope of my invention to use refractory oxides having particle sizes other than those specifically mentioned, such as 100-mesh particle size material, and also to use mixtures of refractory oxides which have substantially the same particle sizes or different particle sizes. For example, the cement composition of Example III contains a refractory oxide mixture of the latter type in which 325-mesh zirconium oxide and 100-mesh aluminum oxide are both present.

The refractory oxide, or mixture of refractory oxides, in my novel cement composition can be any of the conventional refractory oxides which are well known to those skilled in the art. For example, zirconium oxide, aluminum oxide, magnesium oxide, titanium dioxide and silica can be used, either alone or in any combination, in the practice of my invention. It is preferred that the refractory oxide or oxides of my cement be acid resisting, particularly where the cement is to be used for supporting ceramic linings in rocket thrust chambers. However, it is within the scope of my invention to use refractory oxides, such as magnesium oxide, which are not normally considered to be acid resistant in the preparation of my novel cement composition.

The conventional method, familiar to those skilled in the art, of referring to the particle sizes of finely divided solid materials by mesh sizes is employed herein. The mesh size of a material indicates the smallest standard Tyler sieve opening through which substantially all particles of the material will pass.

The light-weight refractory oxide ingredient of my novel cement composition can comprise any of the above-mentioned refractory oxides, or any mixture thereof. Because of its commercial availability, my preferred light-weight refractory oxide is an aluminum oxide bubble aggregate of about 18-mesh particle size. This aluminum oxide bubble aggregate comprises hollow spherical particles, although my invention is obviously not limited to particles of this conformation. Particles of other shapes, but having bulk densities substantially equivalent to those of the corresponding bubble aggregates, can be employed within the scope of my invention. Although refractory oxides other than aluminum oxide, having different particle size and even different particle shape than my preferred bubble aggregate, can be used in the practice of my invention, I have found that 18-mesh aluminum oxide bubbles, of which about 80±7% is greater than 60-mesh in size, is particularly suitable for my purpose.

As indicated previously, it is within the scope of my invention to employ a light-weight insulating material in my novel cement composition if desired, a light-weight insulating component being useful in certain cases if a cement of relatively lower density is preferred. I have found that calcined diatomaceous earth, having a particle size of about 20-mesh or smaller, and preferably having a particle size of 32-mesh, of which at least 70% is larger than 100-mesh, may be employed. My invention is not limited to the use of diatomaceous earth as the light-weight insulating ingredient, however, and other equivalent light-weight insulating materials such as perlite of suitable particle size, can be substituted for the diatomaceous earth within the scope of my invention.

My preferred chemical setting agent is sodium silicofluoride, although other suitable setting agents known to those skilled in the art, such as sodium bisulfate, can be employed if desired.

In preparing the cement compositions of the present invention, any means or order of forming the mixture of ingredients can be employed. It is usually preferable, for purposes of convenience, to separately blend the solid ingredients and the liquid ingredients, and then to mix the solids with the liquids to a substantially homogeneous slurry.

The sodium silicate is preferably added to my cement composition in the form of an aqueous solution having a concentration corresponding to a viscosity of from about 39° to about 43° Bé. In addition to the water in the sodium silicate solution, additional water may be added to the cement composition, for purposes of adjusting its consistency, if necessary or desirable.

My preferred cement compositions are those containing from about 25 to about 35% finely divided refractory oxide; from about 3 to about 8% diatomaceous earth or equivalent light-weight insulating material; from about 25 to about 30% light-weight refractory oxide material such as aluminum oxide bubble aggregate; from about 3 to about 4% setting agent such as sodium silicofluoride; from about 25 to about 31% aqueous sodium silicate solution of about 40° Bé. viscosity; and from about 3 to about 7% water. Other compositions such as those in which the light-weight insulating component has been replaced by a light-weight refractory oxide are, of course, within the scope of my invention. Thus, when there is no light-weight insulating component present there can be as much as about 38% light-weight refractory oxide in my preferred cement compositions.

For best results, the cement compositions of this invention should be dried, for removal of excess moisture, after curing for several hours. I found drying temperatures within the range of from about 140° to about 210° F., and preferably a temperature of about 180° F., to be particularly effective for this purpose. Optimum results are obtained when drying is continued until substantially all of the water in the cement has been lost.

Although the cement of this invention is ideally suitable as support for ceramic linings in uncooled rocket thrust chambers, it obviously possesses properties which make it useful for other purposes as well.

I claim:

1. A cement composition consisting essentially of a mixture of from about 25 to about 35 percent finely divided zirconium oxide; from about 25 to about 38 percent aluminum oxide bubble aggregate; from about 3 to about 4 percent sodium silicofluoride; with the balance being sodium silicate and water.

2. A cement composition consisting essentially of a mixture of from about 25 to about 35 percent finely divided zirconium oxide; from about 25 to about 30 percent aluminum oxide bubble aggregate; from about 3 to about 8 percent diatomaceous earth; from about 3 to about 4 percent sodium silicofluoride; with the balance being sodium silicate and water.

3. A cement composition consisting essentially of a mixture of from about 25 to about 35% finely divided refractory oxide material; from about 25 to about 38% of aluminum oxide bubble aggregate; from about 3 to about 4% sodium silicofluoride; from about 25 to about 31% aqueous sodium silicate solution; and from about 3 to about 7% water.

4. A cement composition consisting essentially of a mixture of from about 25 to about 35% finely divided zirconium oxide; from about 25 to about 38% aluminum oxide bubble aggregate; from about 3 to about 4% sodium silicofluoride; from about 25 to about 31% aqueous sodium silicate solution having a viscosity from about 39° to about 43° Bé.; and from about 3 to about 7% water.

5. A cement composition consisting essentially of a mixture of from about 25 to about 35% finely divided zirconium oxide of about 325-mesh particle size; from about 3 to about 8% diatomaceous earth of about 32-mesh particle size; from about 25 to about 30% aluminum oxide bubble aggregate of about 18-mesh particle size; from about 3 to about 4% sodium silicofluoride; from about 25 to about 31% aqueous sodium silicate solution having a viscosity from about 39° to about 43° Bé.; and from about 3 to about 7% water.

6. A cement composition consisting essentially of a mixture of from about 25 to about 35% finely divided zirconium oxide of about 325-mesh particle size; from about 3 to about 8% diatomaceous earth of about 32-mesh particle size, of which about 70% is of particle size greater than about 100-mesh; from about 25 to about 30% aluminum oxide bubble aggregate of about 18-mesh particle size, of which about 80% is of particle size greater than about 60-mesh; from about 3 to about 4% sodium silicofluoride; from about 25 to about 31% aqueous sodium silicate solution of about 40° Bé. viscosity; and from about 3 to about 7% water.

References Cited in the file of this patent

UNITED STATES PATENTS

| | | |
|---|---|---|
| 1,380,398 | Lougheed | June 7, 1921 |
| 1,682,675 | Horsfield | Aug. 28, 1928 |
| 2,091,973 | Fessler et al. | Sept. 7, 1937 |
| 2,122,960 | Schwartzwalder | July 5, 1938 |
| 2,308,115 | Schwartzwalder et al. | Jan. 12, 1943 |
| 2,340,194 | McMullen | Jan. 25, 1944 |
| 2,438,552 | Field | Mar. 30, 1948 |
| 2,658,332 | Nickolson | Nov. 10, 1953 |
| 2,699,036 | Nickolson | Jan. 11, 1955 |
| 2,773,776 | Weidman | Dec. 11, 1956 |
| 2,818,345 | Vickers et al. | Dec. 31, 1957 |
| 2,842,447 | Schlotzhauer et al. | July 8, 1958 |
| 2,921,859 | Gordron | Jan. 19, 1960 |